United States Patent
Okon et al.

(10) Patent No.: US 9,574,902 B2
(45) Date of Patent: Feb. 21, 2017

(54) CALIBRATION METHOD FOR THE SCALE FACTOR OF AN AXISYMMETRIC VIBRATORY GYROSCOPE OR GYROMETER

(75) Inventors: Isaak Markovich Okon, Brooklyn, NY (US); Alain Renault, Le Cannet (FR)

(73) Assignee: INNALABS LIMITED, Dublin (IE)

(*) Notice: Subject to any disclaimer, the term of this patent is extended or adjusted under 35 U.S.C. 154(b) by 319 days.

(21) Appl. No.: 14/351,602

(22) PCT Filed: Oct. 14, 2011

(86) PCT No.: PCT/RU2011/000806
§ 371 (c)(1),
(2), (4) Date: Apr. 14, 2014

(87) PCT Pub. No.: WO2013/055253
PCT Pub. Date: Apr. 18, 2013

(65) Prior Publication Data
US 2014/0331740 A1    Nov. 13, 2014

(51) Int. Cl.
*G01C 25/00* (2006.01)
*G01C 19/5776* (2012.01)
*G01C 19/5691* (2012.01)

(52) U.S. Cl.
CPC ....... *G01C 25/005* (2013.01); *G01C 19/5691* (2013.01); *G01C 19/5776* (2013.01)

(58) Field of Classification Search
CPC  G01C 25/00; G01C 19/5691; G01C 19/5677; G01C 19/5684; G01C 19/5776; G01C 19/57765

USPC ........................... 73/1.77; 702/151, 150, 104
See application file for complete search history.

(56) References Cited

U.S. PATENT DOCUMENTS

| | | | | |
|---|---|---|---|---|
| 7,628,069 B2* | 12/2009 | Rozelle | ............. | G01C 19/5691 73/1.37 |
| 8,210,023 B2* | 7/2012 | Jeanroy | ................ | G01C 19/567 702/96 |
| 8,733,174 B2* | 5/2014 | Rosellini | ............ | G01C 19/5691 73/658 |
| 2009/0205422 A1 | 8/2009 | Caron et al. | | |
| 2010/0058831 A1* | 3/2010 | Jeanroy | ................ | G01C 25/005 73/1.82 |
| 2013/0204565 A1* | 8/2013 | Rosellini | ................ | G01C 19/56 702/92 |

* cited by examiner

*Primary Examiner* — Daniel S Larkin
*Assistant Examiner* — Nathaniel Kolb
(74) *Attorney, Agent, or Firm* — Bardmesser Law Group

(57) ABSTRACT

The invention relates to gyroscopic instruments. The method for calibrating the scale factor of an angular velocity sensor or an axisymmetric vibratory gyroscope, which method uses a control amplitude signal, a control precessional signal CP and a control quadrature signal CQ for exciting the vibration of a resonator on a resonant frequency, involves a first step of pre-calibration which consists of measuring and recording an initial scale factor and the value of an initial control signal, and a second step of measuring the value of the current control signal and establishing a scale factor SF that is corrected on the basis of a proportional relationship involving the initial scale factor SF°, the initial value of the control signal Y° and the current value of the control signal Y° according to the formula SF=SF°Y/Y°.

10 Claims, 5 Drawing Sheets

CALIBRATION METHOD FOR THE SCALE FACTOR OF AN AXISYMMETRIC VIBRATORY GYROSCOPE OR GYROMETER

FIELD OF THE INVENTION

The invention relates to gyroscopic instrument manufacturing, and can be used for measuring angular velocities and rotation angles relative to an inertial coordinate system as part of orientation, navigation and motion control systems. In particular, a method for calibrating the scale factor of an axisymmetric vibratory gyrometer or an axisymmetric vibratory gyroscope is proposed.

BACKGROUND OF THE INVENTION

It is known that a vibratory gyrometer or gyroscope may be manufactured from an axisymmetric or non-axisymmetric resonator with two degrees of freedom. The present invention relates primarily to the first category, namely, to vibratory rate gyroscope manufactured from axisymmetric resonators. Since axisymmetric resonators may be used in vibratory gyroscopes, the present invention also relates to these types of gyroscopes.

The resonator is made to vibrate at its resonant frequency by an amplitude control signal. The orientation of the vibration is controlled by a precession control signal. The demodulation of this signal makes it possible to know, by calculation, the applied precession rate and/or the inertial angle velocity. The excitation of mechanical vibrations of both the principal mode (antinode) and the precession mode (node) is produced by electrical actuators (electromagnetic, piezoelectric or electrostatic actuators), with a gain which is dependent on the ratio of the force generated, which is applied to the resonator, to the amplitude of the mechanical oscillations' excitation signal. The transmission coefficients of the detectors at the antinode and the node are determined by the ratio of the amplitude of the vibrations to the electrical signal being processed, at the output of the detectors.

The precision of calculation of the rate of rotation is a function of the precision of calculation of the scale factor of the manufactured system, and in particular of the precision of determination of the actuators' and detectors' gains of the resonator. The scale factor is the ratio of the rate of rotation of the vibration to the value of the output signal, in the case of a gyrometer. The scale factor of the vibrating gyroscope is the ratio of the rate of the rotation to the value of the precession control signal, in the case of a gyroscope.

The scale factor is a function of temperature and evolves over time. It is common to compensate for temperature variations in the scale factor using a computation unit and temperature measurements, either by tabulation of the scale factor or by a polynomial calculation. These methods may be inadequate and do not take aging into account.

A method for calibrating the scale factor of a vibratory gyroscope is described in US Patent Publication No. 2005259576. The method consists of measuring the output signal of the vibratory gyrometer or gyroscope while it is mounted on a support set and rotated at a constant rate. The scale factor is the ratio of the value of the applied rate of rotation to the value of the output signal. This method may be carried out before the operational use of the sensor using appropriate means. It cannot be carried out while the sensor is in use, unless another sensor is available.

European Patent EP 2 092 271, published on 08.25.2009, proposes two calibration methods, making it possible to improve the precision of the scale factor in the case of an axisymmetric resonator.

The first method adds to the forces controlling the vibration a stiffness control mechanism, making it possible to modulate the frequency of the vibration. Measuring this frequency modulation makes it possible to carry out a confluent analysis. Since the frequency modulation generally does not exceed 1 Hz, and since the average frequency of the resonators that are normally used is between 2 and 20 kHz, the precision required for the frequency measurement for a scale factor with a precision of 0.05% is of the order of 0.25 to 0.025 ppm. Since the resonant frequency of the resonators used is not sufficiently stable versus temperature, this precision of measurement is not fully consistent with an outdoors operational thermal environment.

The second method consists of processing the amplitude control signal using the amplitude detection signal amplified by a constant gain and which is phase-adapted, and in observing the exponentially increasing evolution of this amplitude, then in inverting the sign of the gain to observe the exponentially decreasing evolution of the amplitude, and also in calculating a correction term based on these observations. After this preliminary phase, the amplitude is adjusted to a fixed value. The drawback of this method is that it causes the amplitude, and therefore the scale factor, to vary significantly during calibration. The device is not operational during calibration. After calibration, the benefits afforded by this operation decrease to zero over time.

DISCLOSURE OF THE INVENTION

Reference will now be made in detail to the preferred embodiments of the present invention, examples of which are illustrated in the accompanying drawings.

The objective of the present invention is to arrive at a scale factor with increased precision and accuracy by performing a calibration of the system while it is in use. The stated objective is achieved in that the precision, accuracy and the reliability of the readings taken by the gyroscope during operation thereof are increased.

The present invention will be explained by specific exemplary embodiments which are not, however, the only possible embodiments but clearly demonstrate the possibility of achieving the required technical result.

DESCRIPTION OF THE FIGURES IN THE DRAWINGS

DETAILED DESCRIPTION OF THE PREFERRED EMBODIMENTS OF THE INVENTION

Figure 1:
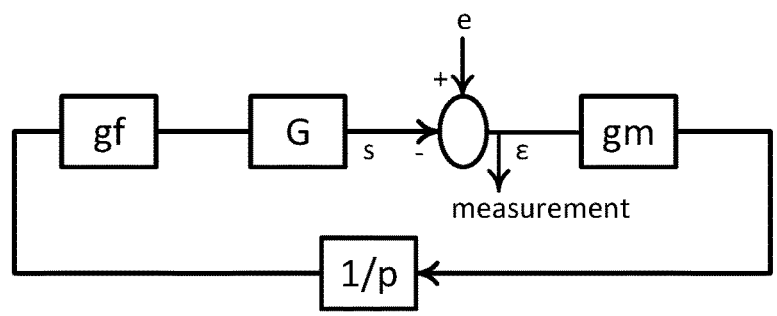
FIG. 1 shows a block circuit diagram of a control circuit.

The implementation of an axisymmetric vibratory gyroscope or a gyrometer comprises processing the amplitude control signal applied in the direction of the vibration with the aim of causing the vibration of the resonator and the precession control signal applied perpendicularly to the direction of the vibration with the aim to cause into a precession vector of vibration. These two control signals are fed at the frequency of the vibration and are in time quadrature with this vibration. A third control signal is applied to the vibration collinearly with the precession control signal and temporally in phase with the vibration. This control signal is intended to counteract the anisotropic effects of the frequency that appear in axisymmetric resonators. In fact, perfect axisymmetry is practically unachievable. For the resonator to give the desired performance, it is necessary to measure, with the detectors, the residual vibration in the direction perpendicular to the direction of the vibration and in temporal quadrature with the latter, and then to cancel this residual vibration using a third control signal. This control signal is normally called the quadrature generator control signal.

According to the present invention, a provision is made for a method of calibration of the scale factor containing an operation of pre-calibration that includes, according to the above method, measuring and storing in memory an initial scale factor, and a calibration operation that includes calculating a value of a measurable quantity connected to the scale factor based on a relationship of proportionality, and in calculating a corrected scale factor based on the ratio of the value of the initial measurable quantity to the current measurable quantity.

Detection gain along each direction varies with changes in temperature and time parameters, and the ratio of the detection gains along two modally orthogonal directions presents a stability greater than the relative stability of each isolated gain. It is possible to perform a calibration of this ratio before operational use of the device. The same applies for the ratio of actuators' gains along two modally orthogonal directions. A current instantaneous measurement of the measurable quantity makes it possible to calibrate the scale factor while the sensor is in use.

The measurable quantity according to a first embodiment is the value of the modulated quadrature detection signal that results from a modulated quadrature generator control signal added to the actual quadrature control signal, taking into account that the modulation frequency is above the bandwidth of the quadrature control loop. The quadrature control signal is modally in the direction perpendicular to the direction of vibration, the low-amplitude vibration resulting from it being temporally phase-shifted with respect to the latter.

According to a second embodiment, the amplitude control signal is amplitude modulated to a frequency above the bandwidth of the amplitude loop, and the measurable quantity is the value of the amplitude modulation measured in the direction of the vibration.

A third embodiment uses a low-frequency quadrature control loop modulated signal with respect to the phase of the detected amplitude. This signal is added to the amplitude excitation. This makes it possible to feed amplitude excitation, which has been modulated at a frequency higher than the frequency band of the quadrature control phase locked loop, in phase with the mechanical vibration, and to measure the resultant signal, which is used for correcting the scale factor.

A fourth embodiment includes modulating the precession control channel. In principle, this control loop has a wide frequency band resulting from the requirements in respect of the measurement of the input angular velocity. In this embodiment, the modulation frequency is within the measurable range of the precession channel, and the measurable output signal is inversely proportional to the gain of the loop. In this case, it is necessary to separate, in the output signal, the measurement of the inertial angular velocity from the modulated signal processed by the generator and to subtract this signal from the output precession signal in order to obtain a correct measurement of the inertial angular velocity.

Thus, there are four embodiments of the proposed method for modulation in phase and in quadrature with the mechanical vibration and measuring the response signal for correcting the scale factor. All of these embodiments can be used either independently, or in combination, with the goal of providing maximum precision in the assessment of the scale factor during operation in real time.

Figure 3:
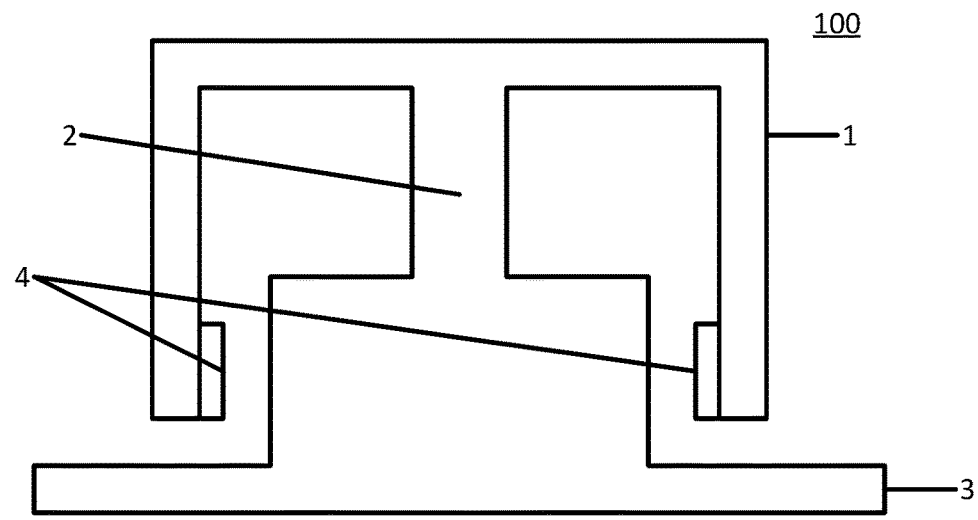
FIG. 3 shows a schematic section of a cylindrical resonator which can be used for implementing the calibration described in the present invention.
Figure 4:
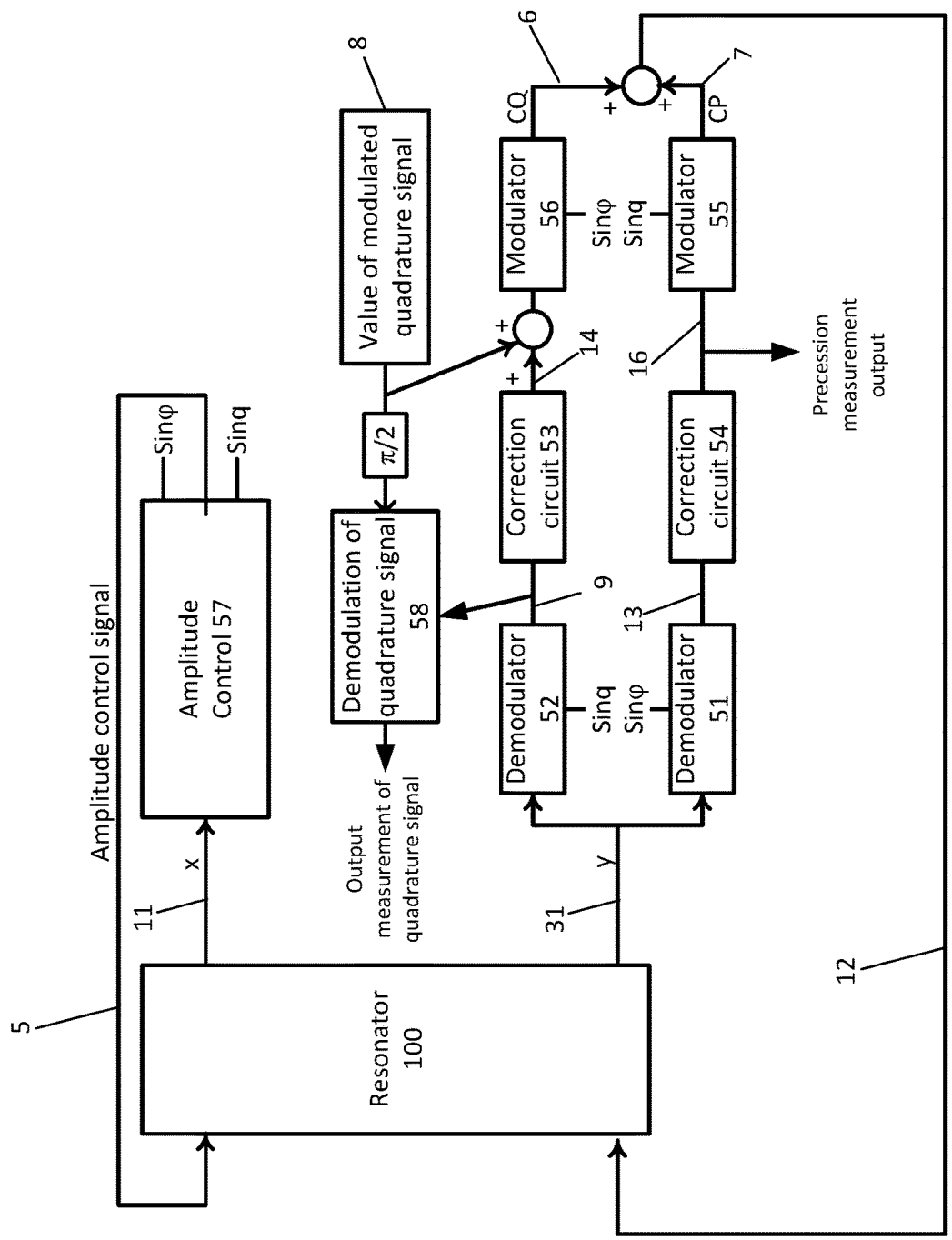
FIG. 4 shows a schematic representation of a first type of calibration described in the present invention, in which the measurable quantity is calculated using a quadrature generator modulated control signal.

With reference to FIG. 3, the calibration method according to the present invention may be implemented with any vibratory gyroscopes or gyrometers using axisymmetric resonators with two degrees of freedom, particularly resonators 100 containing a built-in vibrating cylindrical part 1, fixed to a shaft 2 with a base 3. The detectors and actuators may be piezoelectric or electrostatic elements 4. For the startup in accordance with the method shown in FIG. 4, the resonator 100 is set into vibration at its resonant frequency in a determined direction by an amplitude control signal 5 (CA). In the modally orthogonal direction, the vibration is controlled by the quadrature generator control signal 6 (CQ) and by the precession control signal 7 (CP). The amplitude control (amplitude loop) 57 receives the signal X (signal 11) as input, as well the quadrature signals sin φ and sin q. The sin φ and sin q signals are in phase and quadrature reference signals respectively, at the operating frequency of the resonator, which are used as reference inputs for the modulation and demodulation processes. The signal Y (signal 31) is demodulated by demodulators 52 and 51, to produce the signal 9 and signal 13, respectively, as show in FIG. 4. Correction circuits 53 and 54 are applied to the signals 9 and 13, respectively, to produce output signals 14 and 16, respectively. The signals 14 and 8 are added, and then modulated by the modulator 56 to produce the quadrature control signal CQ (6). The signal 16 represents the precession measurement output, and is modulated by the modulator 55 to produce the signal CP (7). The signal 9 is demodulated in block 58 to produce the output of measurement of the quadrature signal. The signals CP and CQ are added to produce the signal 12, which is fed back to the resonator 100.

According to the first calibration method, an alternating control signal 8 of a constant frequency is applied to the output of the quadrature loop upstream of the modulator 56. The frequency of the alternating control signal 8 is above the bandwidth of the quadrature loop 53. The alternating signal 9 that appears at the output of the demodulator 52 includes the measurable quantity.

An electronic startup device, in particular a voltage and frequency generator, sets the amplitude of the vibration to a set point value of the control signal Xc along a first direction x, whereas the amplitude of the vibration along a direction y modally orthogonal to the direction x is processed under the action of Coriolis forces. The force along x is the amplitude control signal. The force compensating for the vibration along y is the sum of the precession control signal CP (7) and the quadrature control signal CQ (6). The value of the precession control signal CP (7) determines the rate C1. The alternative quadrature signal 8 is added to the signal 14 delivered by the quadrature loop correction circuit 53. The resulting signal is modulated by 56 to deliver the quadrature control signal CQ (6). The frequency of the modulation of the signal 8 is above the quadrature loop bandwidth. The detected signal 9 delivered by the demodulator 52 from the signal 31 is the measurable quantity when demodulated by 58 with the phase lagged ($\pi/2$) modulated signal 8.

The equations of forces along (the direction of) y are as follows:

$$my'' + fy' + ry = CQ + 2mx'\Omega + CP \tag{1}$$

where m is the modal mass, f is the damping, r is the stiffness, y is the amplitude of the vibration along y, x is the amplitude of the vibration along x, and $\Omega$ is the rate of rotation.

The resonator 100 exhibits negligible damping, which makes it possible to simplify the equation by removing this term. When the gyroscopic chain functions efficiently, the Coriolis force due to the rotation and the force due to the precession control signal CP (7) balance out:

$$2mx'\Omega + CP = 0 \tag{2}$$

Where $$x = x° \cos b \text{ and } x' = -x°bn' \sin b \tag{3}$$

where b=current phase of the vibration of amplitude x°. Eq. (1) simplifies to:

$$my'' + ry = CQ. \tag{4}$$

For a quadrature control signal CQ=CQ° cos a cos b the quadrature amplitude y is:

$$y = y° \sin a \sin b \tag{5}$$

where a=current phase of the modulation of the quadrature signal with amplitude y°:

$$y' = y°(\alpha' \cos a \sin b + b' \sin a \cos b) \tag{6}$$

$$y'' = y°(-a'^2 \sin a \sin b + a'b' \cos a \cos b + a'b' \cos a \cos b - b'^2 \sin a \sin b). \tag{7}$$

Inserting Eq. (5) and Eq. (7) in Eq. (4) and omitting the very small second order value gives:

$$CQ = CQ° \cos(a)\cos(b) = my°2a'b' \cos(a)\cos(b) \tag{8}$$

In practice, taking into account the actuator gain gm along the direction y and the detector gains gd along x and gf along y, Eq. (2) becomes:

$$2mx°b' \sin b * \Omega = CPgm = CP° \sin b gm. \tag{9}$$

Considering that:

$$x°gd = Xc \tag{10}$$

where Xc is the setpoint value of the amplitude control signal 5 of the amplitude regulation loop 57, Eq. (8) can become:

$$CQ°gm = my°2a'b'. \tag{11}$$

Considering that:

$$y°gf = Y, \tag{12}$$

the following ratio can be determined from Eq. (11) and Eq. (12):

$$\frac{Y}{CQ°} = \frac{gmgf}{2ma'b'}, \tag{13}$$

the following ratio can be determined from Eq. (9) and Eq. (10):

$$\frac{\Omega}{CP°} = \frac{gmgd}{2mXcb'}, \tag{14}$$

and the following ratio from Eq. (13) and Eq. (14):

$$\frac{\Omega}{CP°} = \frac{a'gd\,Y}{CQ°\,gf\,Xc}. \tag{15}$$

As stated above, the ratio of the detection gain gd along x to the detection gain gf along y is stable, so that, for a stable quadrature modulation control signal CQ° and a stable amplitude vibration control signal Xc, and a pulse a' of the quadrature control signal of stability equal to that of pulses in a synchronized pulse generator, the ratio $$\frac{\Omega}{(CP°Y)}$$

is constant. In practice, the scale factor $$\frac{\Omega}{CP°}$$

and the quantity Y are measured at the factory before delivery of the gyroscope and stored in memory in the computation unit of the gyroscope. During operational functioning of the gyroscope, the quantity Y is measured, which makes it possible to apply a correction coefficient based on Eq. (15) to the scale factor SF.

Eq. (15) gives:

$$\Omega/CP° = a'gdY°/(CQ°gfXc) = SF° = KY°$$

as the initial scale factor $SF°$, where $$K = a'gd/(CQ°gfXc).$$

The scale factor SF measurable during operation is as follows:

$$SF = SF°Y/Y° \tag{15a}.$$

Figure 5:
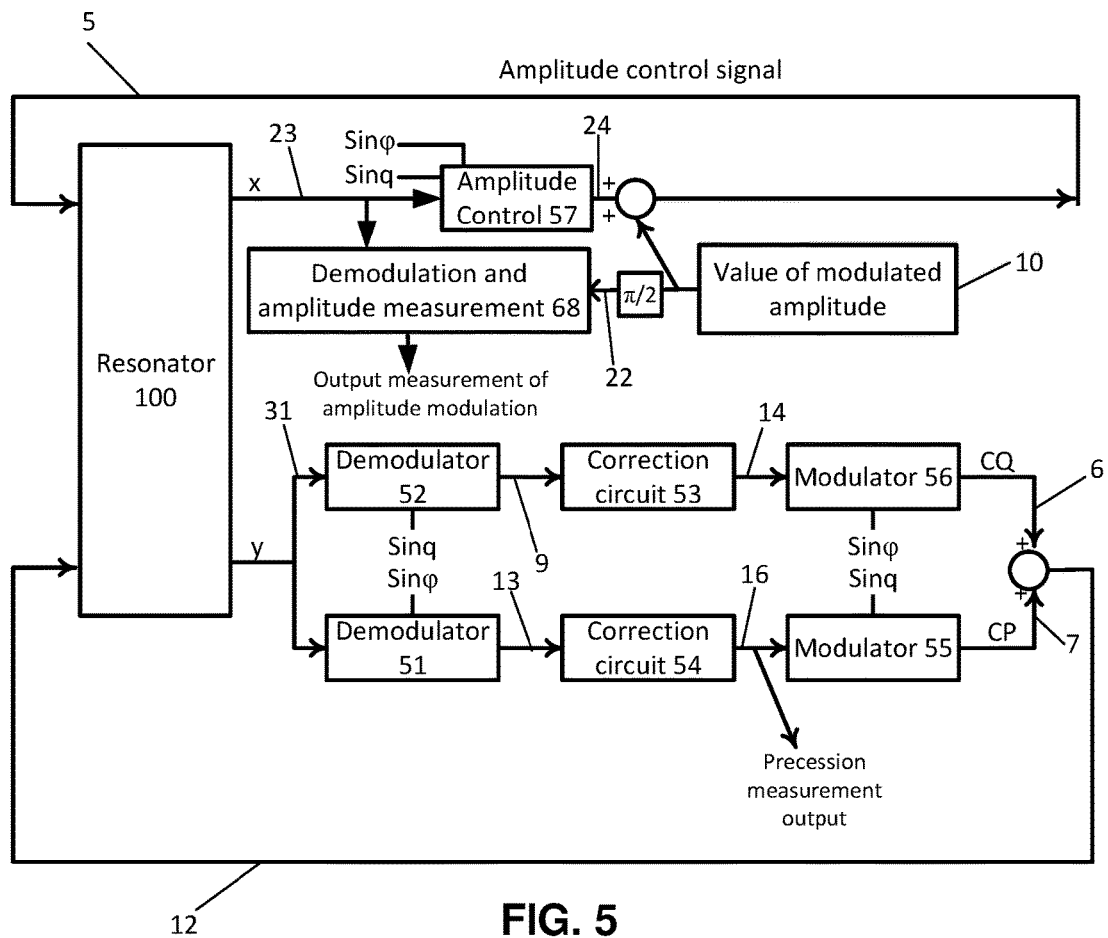
FIG. 5 shows a schematic representation of a second type of calibration described in the present invention, in which the measurable quantity is calculated using an amplitude and a frequency modulated amplitude control signal.

According to the second calibration method, with reference to FIG. 5, an amplitude modulated signal 10, whose carrier is in phase with the amplitude control signal 24 which is at the resonance frequency of the resonator, and whose amplitude modulation frequency is above the bandwidth of the amplitude control loop, is added to the signal 24.

The measurable quantity is included in the signal 23. It is demodulated first at the resonance frequency and second at the amplitude modulation frequency by the block 68 with phase lagged ($\pi/2$). All other functional blocks in this diagram operate in an identical manner to those described previously (FIG. 4).

The electronic startup device sets the amplitude of the vibration to a setpoint value of the control signal Xc along a first direction x, whereas the amplitude of the vibration is set to a value of the quadrature control signal CQ (6) along a direction y modally orthogonal to the direction x. The force along x is the amplitude control signal 5. The force along y is the sum of the precession control signal CP (7) and the quadrature control signal. An amplitude modulated control signal 10 is added to the amplitude control signal 24, to deliver to the resonator the signal 5. The signal 23 delivered by the resonator includes the measurable quantity. It is demodulated at the resonance frequency and at the modulation frequency by the block 68, to deliver the measurement of the amplitude modulation.

The equation of forces acting along x is as follows:

$$mx''+fx'+rx+CA=O \quad (16)$$

where m is the modal mass, f is the damping, r is the stiffness, and x is the amplitude of the vibration along x.

The resonator 100 exhibits negligible damping, which makes it possible to remove this term. Removing the value of this damping and the constant CA (5) simplifies the equation as follows:

$$mx''+rx+CA=0 \quad (17)$$

For an amplitude control signal $CA=CA°\cos a \sin b$ the amplitude x is:

$$X=(x°+x\sin a)\cos b \quad (18)$$

where a=current phase of the amplitude modulation y°:

$$x'=-x°b'\sin b+x(a'\cos a \cos b-b'\sin a \sin b) \quad (19)$$

$$x''=-x°b'^2 \cos b+x(-a'^2 \sin a \cos b - a'b'\cos(a)\sin(b)-a'b'\cos(a)\sin(b)-b'^2\sin(a)\cos(b)) \quad (20)$$

The signal CA (5) is:

$$CA=CA°\cos a \sin b=mx2a'b'\cos a \sin b \quad (21)$$

In practice, given the detection gain gd along the direction x and the actuator gains gn along the direction x and gm along the direction y, equation (2) becomes:

$$2mx°b' \sin b\Omega=CPgm=CP°\sin b gm$$

Considering that:

$$x°gd=Xc,$$

Eq. (21) becomes:

$$CA°gn=mx2a'b' \quad (22)$$

Considering that:

$$xgd=X \quad (23)$$

the following ratio can be determined from Eq. (22) and Eq. (23):

$$\frac{X}{CA°}=\frac{gngd}{2ma'b'} \quad (24)$$

the following ratio can be determined from Eq. (9) and Eq. (10):

$$\frac{\Omega}{CP°}=\frac{gmgd}{2mXcb'}$$

and from Eq. (24) and Eq. (14):

$$\frac{\Omega}{CP°}=\frac{a'\,gm\,X}{CA°\,gn\,Xc} \quad (25)$$

As stated above, the ratio of the actuator gain gn along x to the actuator gain gm along y is stable, so that for a stable vibration amplitude control signal CA° and a stable vibration amplitude control signal Xc, and a pulse a' of the amplitude control modulation signal 10 of stability equal to that of pulses in a synchronized pulse generator, the ratio $$\frac{\Omega}{(CP°X)}$$

is constant. In practice, the scale factor $$\frac{\Omega}{CP°}$$

and the quantity X (signal 23) are measured at the factory before delivery of the device and stored in memory in the computation unit of the device. During operation, the quantity X (signal 23) is measured, which makes it possible to apply a correction coefficient based on Eq. (25) to the scale factor SF. The scale factor SF is modulated like the amplitude of the vibration and may be subject to a correction for enhanced performance of the equipment.

Eq. (25) gives the initial scale factor SF°, as follows:

$$\Omega/CP°=a'gmX°/(CA°gnXc)=SF°=KX°.$$

The scale factor in real time is:

$$SF=KX=SF°X/X° \quad (25a),$$

where $$K=a'gm/(CA°gnXc).$$

It should be noted that the calibration methods described herein are not limited to the procedures mentioned above and can be varied within the scope of the present invention.

Figure 6:
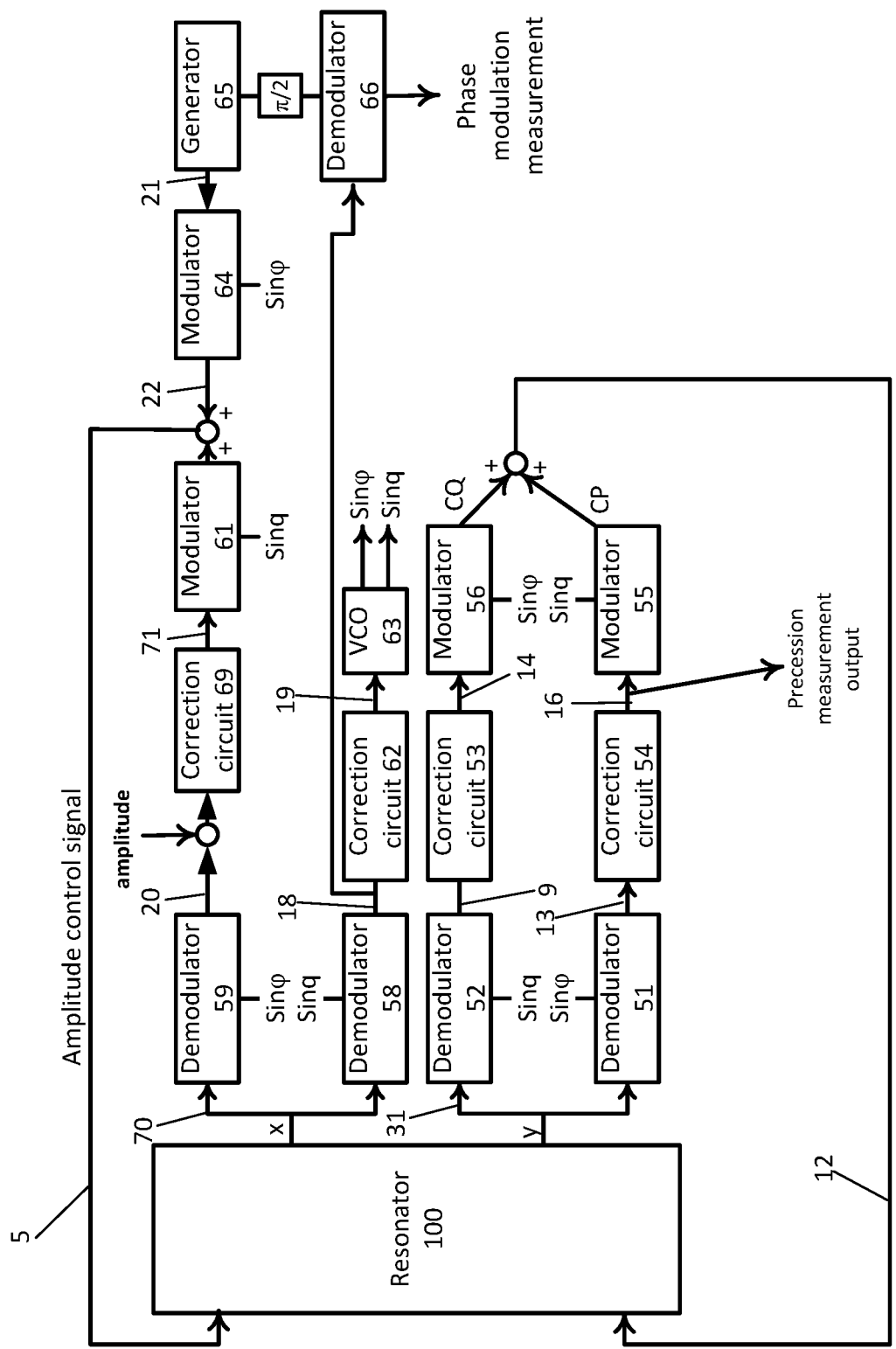
FIG. 6 shows a block circuit diagram of a third embodiment of the proposed method, which comprises generating a measurable modulated excitation signal in phase with the mechanical vibration.
Figure 7:
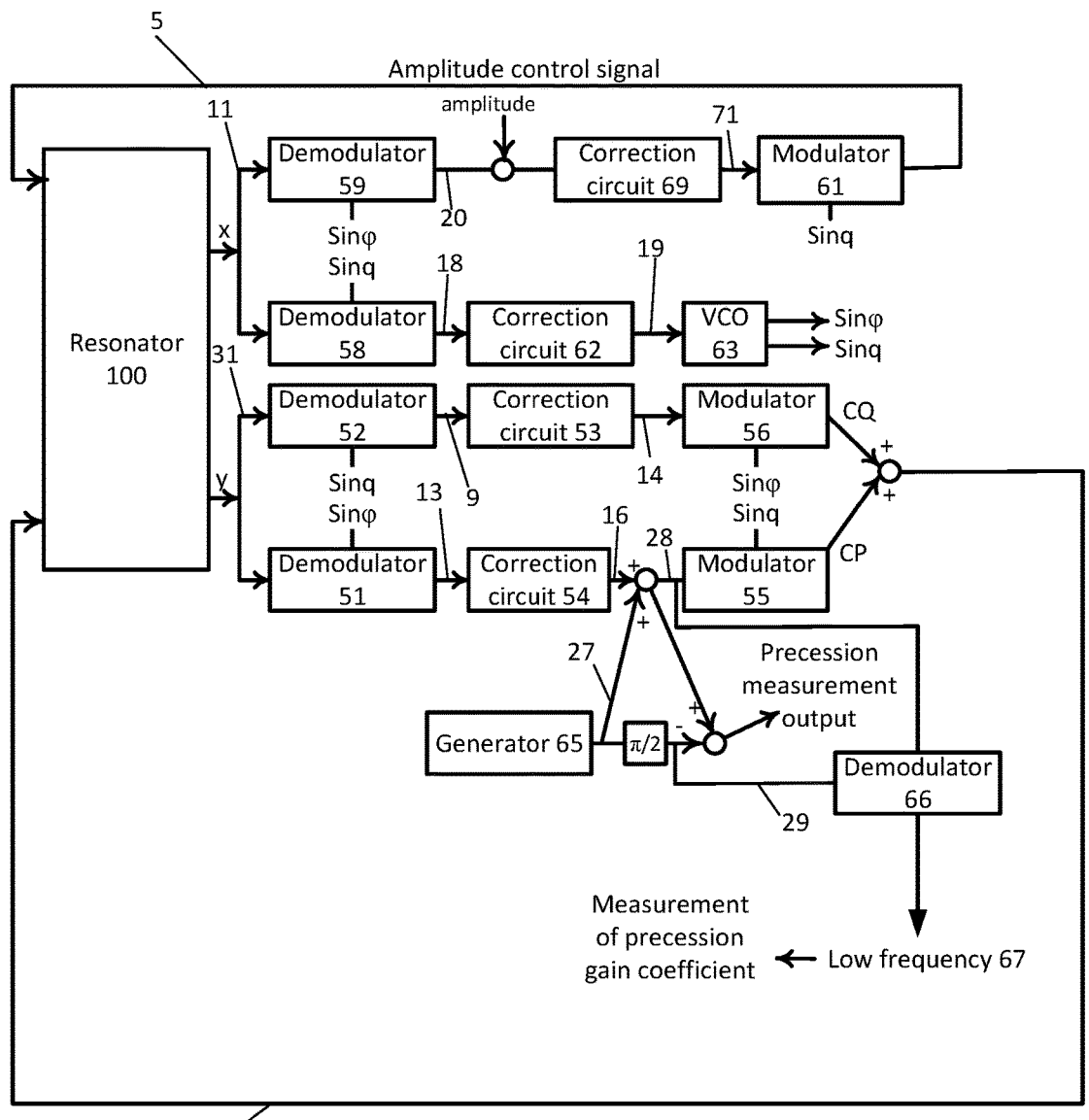
FIG. 7 shows a block circuit diagram of a fourth possible embodiment of the method, which comprises generating a measurable modulated signal in precession control loop.

Analytical calculations, which have been performed, are applicable for producing correction factors for the scale factor applicable to the third and fourth embodiments in accordance with the block circuit diagrams shown in FIGS. 6, 7.

In FIG. 6 the demodulator 59, correction circuit 69 and modulator 61 show functional blocks for the amplitude control loop. Similarly, demodulator 58, correction circuit 62 and voltage controlled oscillator (VCO) 63 show functional blocks for the locking the control loop signals to the resonator vibration frequency. The output signal 70 from the resonator 100 along direction x is applied to demodulator 59. The output 20 is compared to a fixed reference amplitude level and the output 71 of correction circuit 69 is adjusted to maintain a constant value. This signal is applied to modulator 61 to produce an alternating signal 5 which is applied to the resonator 100. Signal 70 is also applied to demodulator 58 and the output 18 then applied to correction circuit 62 with the output 19 then applied to VCO 63. The VCO produces alternating output signals sin $\phi$ and sin q which are alternating in phase and quadrature signals at the resonator 100 operating frequency. All other components are as previously described and have like numerals.

In the third embodiment, generator 65 produces a low frequency modulated signal 21, modulated at a frequency above the bandwidth of the amplitude control loop. This signal is applied to modulator 64 to produce an amplitude modulated quadrature signal 22 which is added to the output of modulator 61. The output signal from modulator 61 is in phase, whereas the output 22 of modulator 64 is in quadrature, therefore the resultant signal 5 is of varying phase, modulated at the frequency of the generator 65. The output signal 70 will therefore also be phase modulated and the output signal 18 from demodulator 58 is the measurable quantity which is used for scale factor correction. This signal is applied to demodulator 66 which demodulates with respect to the generator 65 signal, which has been phase shifted by $\pi/2$, to provide a value for the measured phase modulation.

In the fourth embodiment, shown in FIG. 7, the operation of the amplitude control (CA), frequency control and quadrature control (CQ) loops are as described previously and like numerals are used. In this embodiment the generator output 65 is applied to the precession control loop and is summed with the output 16 of correction circuit 54 to produce a modulated signal 28, which is the measurable quantity, at the input to modulator 55. Ideally the modulation frequency applied by generator 65 should be low compared to the resonator operating frequency but above the normal bandwidth of precession measurement loop. Signal 28 is also applied to demodulator 66 which demodulates the signal with respect to generator signal 27 which has been phase shifted through $\pi/2$ to produce signal 29. The output 67 is a low frequency signal whose value is measured precession modulation amplitude. Signal 29 is subtracted from signal 28 to remove the low frequency phase modulation from the precession measurement, which is the output of the gyrometer.

Furthermore, CE=CE° cos(a)sin(b) and Eq. (13) now have the form $$Y/CE°=gmgf/(2ma'b'), y=y° \sin(a)\cos(b) \quad (13a)$$

and Eq. (15) will be $$\Omega/CP°=a'gdY/(CE°gfXc) \quad (15a)$$

In the case of excitation within the frequency band of the control loop, it is necessary to consider the reaction of the control loop to the additional signal that causes a distortion of the measurable inertial angular velocity at the output. The block circuit diagram of the control loop for this case is shown in FIG. 1, where gf and gm, as before, are the detection and actuator gains in the channel Y, and the integrating factor 1/p is the resonator 100 and G is the gain of the electronics. For simplification purposes, we will use the coefficient of the electronics and not the real transfer function of the channel Y. This simplification does not have any effect on the result or on the analytical conclusions below.

The frequency band in this case is determined by the following expression $$gfgmG/(2\pi)$$

The coefficient of the open circuit at the measurement point is as follows:

$$OLG=gmgfG/p$$

$$\epsilon=e-OLGE$$

$$\epsilon/e=1/(1+OLG)=1/(1+gmgfG/p)=p/(gmgfG)*1/(1+p/(gmgfG)).$$

Figure 2:
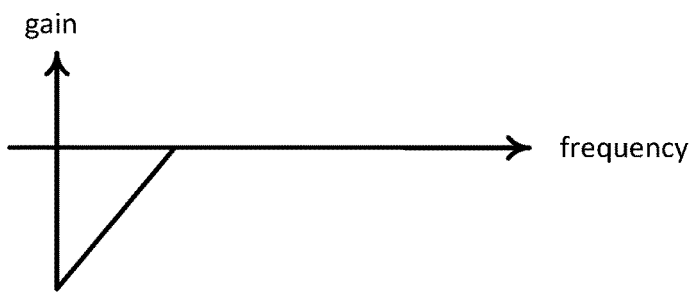
FIG. 2 shows a function in accordance with a Bode plot.

This function has a response corresponding to the Bode plot (FIG. 2). This high-frequency filter blocks low frequencies, which corresponds to a frequency band of the gyrometer and to the high gain of the loop. Therefore, within the frequency band of approximation the response can be determined by the following expression:

$$p/(gmgfG).$$

The measurement of the output E determines the signal which is dependent on the piezoelectric elements and on the gain G, which is very stable and can be estimated precisely.

Depending on the conditions of use of the gyrometer, it is possible, at the output of the precession control loop, which is the sum of the inertial angular velocity and the reaction to the measurable and known signal of the generator, to filter out the latter, assuming that rapid changes in the output are associated with the measurable inertial angular velocity, whereas the response to the set signal of the generator is slow and is associated with the changes in the gain of the detectors and actuators and the change in the scale factor, which is determined by the proposed method. This method for filtering and isolating a signal which can be used to determine the current value of the scale factor is essentially dependent on the dynamics of a measurable inertial velocity that is the dynamics of an object on which a gyroscopic sensor is mounted.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A calibration method for the scale factor of an axisymmetric vibratory gyroscope or gyrometer, the method comprising:
    applying an amplitude control signal CA to an amplitude control loop;
    applying a precession control signal CP to a precession control loop;
    applying a quadrature control signal CQ to a quadrature control loop,
    the signals CA, CP and CQ being applied to a resonator so as to set it into vibration at its resonant frequency, and further performing the following steps:
    (1) a first step of pre-calibration, including measuring and storing in memory an initial scale factor SF° and an initial control signal value detected when a modulated signal is added to one of the amplitude control loop, the precession control loop or the quadrature control loop; and (2) a second step of measuring the current control signal value detected when the modulated signal is added to one of the amplitude control loop, the precession control loop or the quadrature control loop; and calculating a corrected scale factor SF according to a relationship of proportionality including the initial scale factor SF°, the initial control signal value and the current control signal value, according to the formula:

$$SF = SF° \left( \frac{\text{current control signal value}}{\text{initial control signal value}} \right);$$

and using the corrected scale factor to correct a raw output of the gyroscope or gyrometer that represents a rotation rate.

2. The method of claim 1, wherein the control signal is a quadrature amplitude modulated signal based on a modulated quadrature signal applied to the quadrature control loop.

3. The method of claim 1, wherein the control signal is an amplitude modulated signal based on the modulated signal is applied to the amplitude control loop.

4. The method of claim 1, wherein the control signal is a detected modulated signal with an amplitude in quadrature to the signal applied to the amplitude control loop.

5. The method of claim 1, wherein the control signal is an amplitude modulated precession signal based on a modulation applied to the precession control loop, and wherein the modulation is subtracted from the precession signal prior to outputting the angular velocity measurement.

6. A calibration method for the scale factor of an axisymmetric vibratory gyroscope or gyrometer, the method comprising:

applying an excitation signal to a resonator of the vibratory gyroscope or the gyrometer so as to set it into vibration at its resonant frequency;

wherein an amplitude of the vibration at the resonant frequency is controlled by an amplitude control signal, and wherein a precession control signal (CP) and a quadrature control signal (CQ) are based an output of the gyroscope or gyrometer, and are added together to generate a correction to the amplitude control signal for removing a quadrature component of the vibration and to measure an angular rotation velocity of the resonator;

wherein the calibration also includes (1) a first step of pre-calibration that includes measuring and storing in a memory an initial scale factor and an initial calibration signal value detected when a modulated signal is added to one of the amplitude control loop, the precession control loop or the quadrature control loop, and (2) a second step of measuring a current calibration signal value, and calculating a corrected scale factor SF according to a proportionate relationship, including an initial scale factor SF°, the initial calibration signal value and the current calibration signal value, according to a formula:

$$SF = SF° \left( \frac{\text{current calibration signal value}}{\text{initial calibration signal value}} \right);$$

and using the corrected scale factor to correct a raw output of the gyroscope or gyrometer that represents a rotation rate.

7. The method of claim 6, wherein the control signal is a quadrature amplitude modulated signal based on a modulated quadrature signal applied to the quadrature control loop.

8. The method of claim 6, wherein the control signal is an amplitude modulated signal based on the modulated signal is applied to the amplitude control loop.

9. The method of claim 6, wherein the control signal is a detected modulated signal with an amplitude in quadrature to the signal applied to the amplitude control loop.

10. The method of claim 6, wherein the control signal is an amplitude modulated precession signal based on a modulation applied to the precession control loop, and wherein the modulation is subtracted from the precession signal prior to outputting the angular velocity measurement.

* * * * *